April 2, 1963 J. L. LIDSTROM 3,083,852
FREIGHT HANDLING APPARATUS
Filed April 25, 1960 3 Sheets-Sheet 1
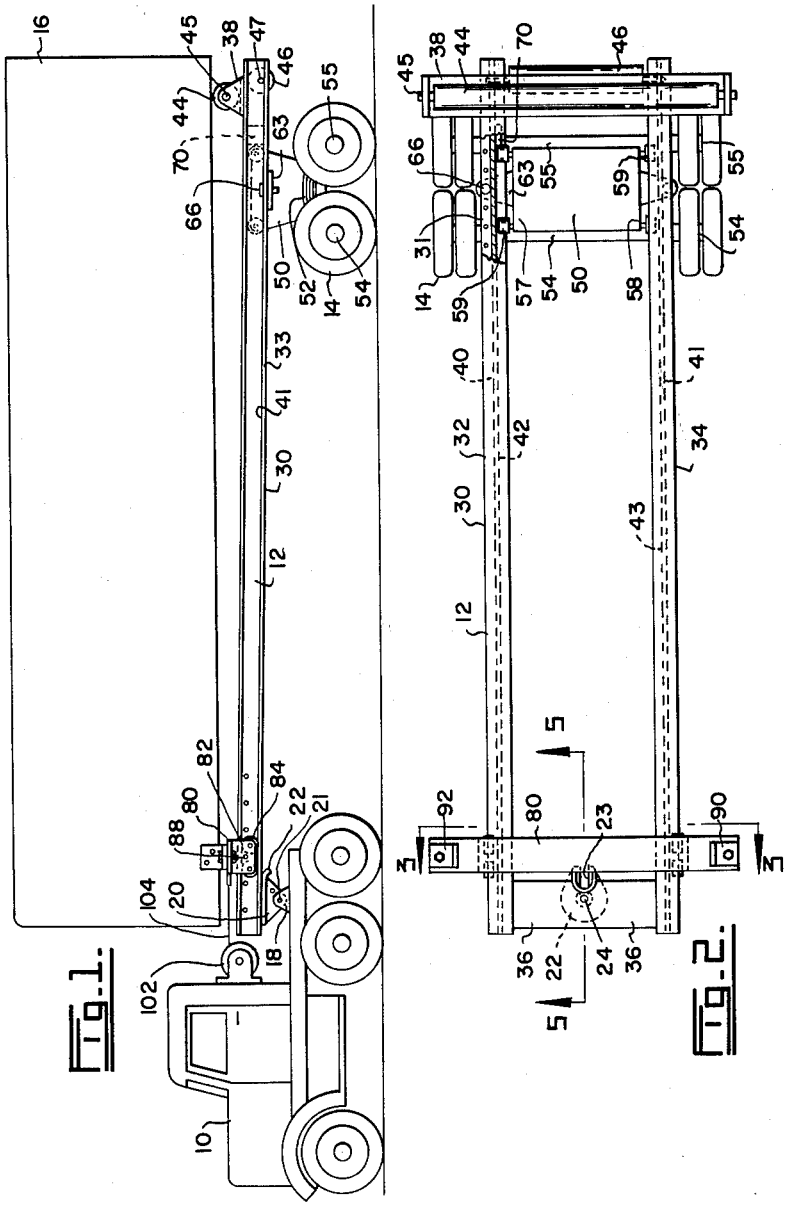
INVENTOR
JOHN L. LIDSTROM
BY
Fetherstonhaugh & Co.
ATTORNEYS April 2, 1963   J. L. LIDSTROM   3,083,852
FREIGHT HANDLING APPARATUS
Filed April 25, 1960   3 Sheets-Sheet 2

INVENTOR
JOHN L. LIDSTROM
BY
Fetherstonhaugh & Co.
ATTORNEYS

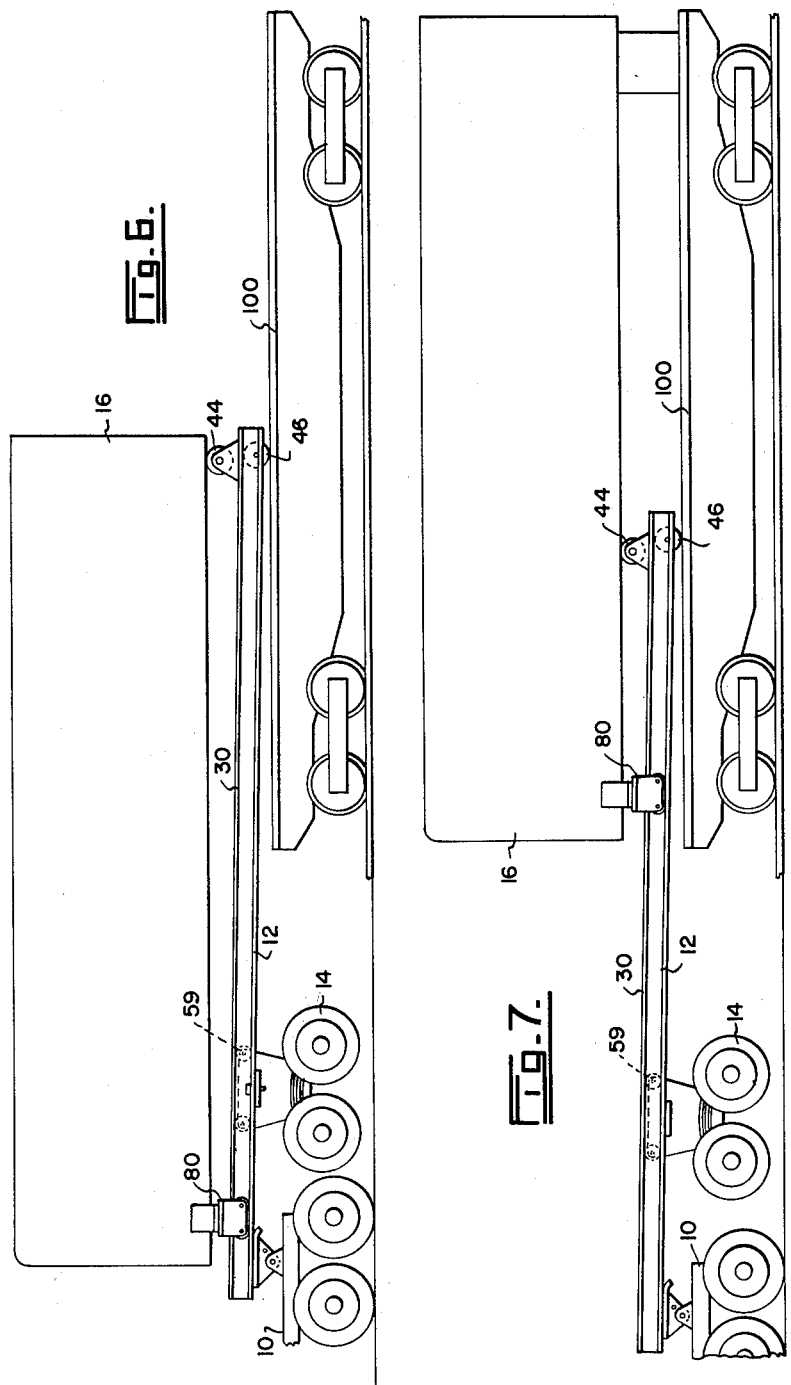

United States Patent Office 3,083,852
Patented Apr. 2, 1963

3,083,852
FREIGHT HANDLING APPARATUS
John L. Lidstrom, Minstrel Island, British Columbia, Canada
Filed Apr. 25, 1960, Ser. No. 24,357
19 Claims. (Cl. 214—515)

This invention relates to freight handling apparatus and in particular to a vehicle designed for highway operation and provided with means whereby a demountable freight container adapted to be carried by said vehicle can readily be transferred to or from the vehicle and another vehicle or a stationary loading point, the container as a whole being moved around thereby obviating the necessity of unloading the freight therefrom.

The invention finds particular application as part of an integrated railroad freight handling system wherein the long distance movement of heavy loads is effected by rail with the freight being transported by road to and from points away from the railroad and transferred to rail at selected focal rail points. The invention is not, however, restricted to this application and is equally suitable for transferring freight from one road vehicle to another or to and from a road vehicle and the ground, a stationary loading platform or the like.

A primary object of the invention is to provide a freight handling apparatus which enables the freight loading and transfer time to be reduced and which obviates any double handling of the freight at transfer points.

Another object of the invention is to provide a freight handling apparatus which enables freight to be transferred from one freight carrier to another, or from the ground or a storage location to a freight carrier or vice versa in a rapid and economical manner.

In accordance with these objects, the present invention contemplates the provision of a vehicle having a prime mover, a trailer connected to said vehicle, a rear wheel assembly positioned beneath and coupled to said trailer, said rear wheel assembly movable longitudinally of said trailer and means releasably locking said rear wheel assembly at selected positions along said trailer.

Other features of the invention will be described hereinafter and referred to in the appended claims.

Figure 3:
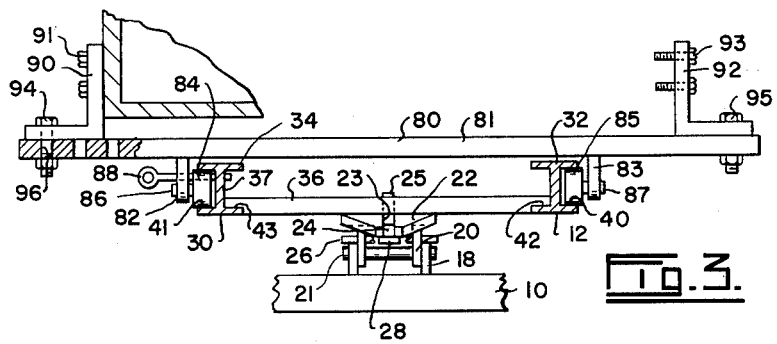
Figure 4:
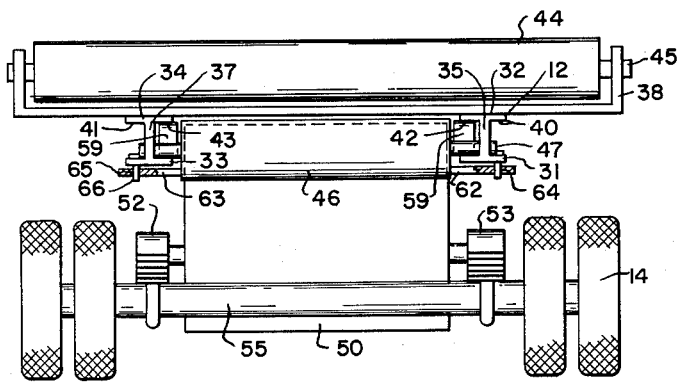
Figure 5:
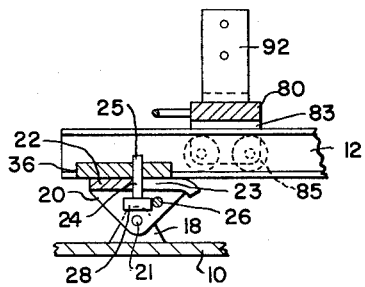

The invention will now be more particularly described in connection with the accompanying drawings which show by way of example one embodiment of the invention and in which:

FIGURE 1 is a side elevational view of a vehicle according to this invention with a load mounted thereon, FIGURE 2 is a top plan view of the semi-trailer assembly, FIGURE 3 is a sectional view on the line 3—3 of FIGURE 2, FIGURE 4 is an end elevation view of the semi-trailer assembly and FIGURES 5, 6 and 7 are diagrammatic views showing various stages in the unloading of a freight container from the vehicle onto a railroad freight car.

Referring to the drawings, the vehicle comprises a tractor unit designated 10, a semi-trailer 12 coupled to the tractor at the front end thereof and provided with a single or multiple axle rear wheel assembly indicated generally at 14 and a demountable freight container 16 removably mounted on the semi-trailer 12.

The tractor unit 10 may be of any conventional type and no detailed description thereof is deemed necessary herein.

The semi-trailer 12 comprises a framework 30 formed of two spaced-apart longitudinal members 32 and 34 connected together at their front ends by a cross beam 36 and adjacent their rear ends by a channel section frame member 38. The longitudinal members 32 and 34 each consists of an I-beam, the outer channels 40 and 41 and inner channels 42 and 43 of which form two pairs of parallel tracks extending longitudinally of the semi-trailer 12. The transverse frame member 38 extends across the longitudinal members 32 and 34 and is secured thereto as, for example by welding. A roller 44 rotatably mounted on a shaft 45 extends transversely of the frame, the shaft 45 being journalled at either end to the side walls of frame member 38. The roller 44 extends upwardly above the trailer framework and is spaced inwardly of the rear end thereof. Preferably, roller 44 extends above the trailer framework to a distance such that it is higher than the front end of the trailer when the rear wheel assembly 14 is at its normal rearmost position. A further roller 46 is rotatably mounted on a shaft 47 journalled at either end to the webs 35 and 37 of the longitudinal member 32 and 34 respectively and projects downwardly below the trailer frame. If desired, the rollers 44 and 46 may be replaced by any other suitable rotatable bearings.

The rear wheel assembly 14 includes a bolster 50 connected by means of semi-elliptical leaf springs 52 and 53 to the bogie axles 54 and 55 carrying the rear wheels 56. The bolster 50 is provided at the top corners of each of its sides 57 and 58 with rollers 59 which are rotatably mounted in spindles journalled to the bolster. The rollers 59 are adapted to engage the opposed inwardly facing channels 42 and 43 of the longitudinal members 32 and 34 respectively which form tracks along which the bolster may be traversed. The bolster 50 is also provided with brackets 62 and 63 projecting outwardly from the sides thereof beneath the bottom flanges 31 and 33 of the longitudinal members 32 and 34 respectively. Apertures 64 and 65 are formed in the brackets 62 and 63 respectively and these apertures 64 and 65 may be brought into register with similar apertures formed in the outer portion of flanges 31 and 33 respectively at selected positions therealong. Pins 66 and 67 which are adapted to be passed through these apertures form convenient means for locking the bolster 50 to the trailer 12. A stop member 70 is secured within the inwardly facing channel 42 of longitudinal member 34 and serves to limit the rearward movement of the bolster along the trailer. In order that loads may be lifted on and off the trailer from levels below the level of the trailer frame the wheel assembly 14 is preferably designed so that when in its normal outermost position, i.e. adjacent the rear end of the trailer the overall height at the rear end is less than the overall height at the front end of the trailer. This height differential is sufficient to allow the roller 46 to touch ground level when the wheel assembly 14 is moved to a position substantially midway along the trailer. This permits lifting of loads from below the trailer level and ensures that the trailer frame is not subjected to undesirable stresses as a load is moved on or off the trailer. It also obviates any tendency to lift the tractor unit which would occur if the amount of unsupported frame overhang were allowed to become excessive. Obviously in applications where it is not desired to lift loads from a level below that of the trailer it would not be necessary to provide this height differential.

The tractor unit 10 includes a coupling assembly fixedly mounted on the chassis thereof to permit the normal fifth wheel connection to be made to the semi-trailer 12. The coupling assembly may be of any suitable type and as shown includes a pair of lugs 18 and 19 upstanding from the chassis of tractor 10. A bracket 20 is mounted between the lugs 18 and 19 and pivotally connected thereto by means of a hinge pin 21 which is connected to the bracket 20 and journalled at each end to the lugs 18 and 19. The bracket 20 is formed with a dish-shaped portion 22 provided with a slot 23 adapted to receive the shank 25 of a pin 24 which is secured to the underside of beam 36 and depends downwardly therefrom terminating in a head portion 28. To effect the fifth wheel connection, the shank 25 of pin 24 is moved into slot 23 as far as it will go and the pin 24 is locked in position within the slot by means of a latch member 26. With this coupling arrangement, the trailer 12 is permitted a degree of free movement in both the vertical and horizontal places at its connection with the tractor 10.

A bunk 80 is mounted on the trailer 12 and is movable longitudinally thereof. The bunk 80 consists of a beam 81 provided with a pair of spaced apart arms 82 and 83 depending downwardly therefrom and rollers 84 and 85 rotatably mounted on spindles 86 and 87 journalled into the arms 82 and 83 respectively. The rollers 84 and 85 are adapted to engage the outwardly facing channels 40 and 41 of the longitudinal members 32 and 34 respectively which form tracks enabling the bunk 80 to be moved from end to end of the semi-trailer 12. Suitable means are provided on the bunk and the trailer framework for locking the bunk at selected positions along the trailer. The locking means for the bunk 80 may for example comprise a pin 88 adapted to be passed through an aperture formed in the arm 82 and a similar aperture formed in the web 37 of longitudinal member 34 thereby securely to lock the bunk to the frame. If desired, a series of apertures may be provided along the web 37 so that the bunk 80 may be locked at any one of a number of selected positions along the trailer frame. Also, if desired, and for greater security similar locking means may be provided on the other side of the bunk 80. The bunk is adapted to support the front end of a demountable freight container such as 16 which is to be carried by the trailer.

The freight container 16 is shown in the form of a hollow box which may be positioned upon a flat trailer, flat top railroad car or the like but it will be appreciated that it may be of any other suitable form depending upon the type of freight to be transported. Thus, for example, if it is desired to transport loads of logs, instead of the box container the trailer would be provided with stakes protruding upwardly therefrom at selected points along the periphery thereof in conventional fashion and adapted to receive the load therebetween. The container 16 is provided adjacent the lower front edge of each side thereof with L-shaped brackets 90 and 92 secured thereto by means of bolts 91 and 93. The brackets are adapted to be secured to the bunk 80 by bolts 94 and 95 which may be passed through apertures formed in the brackets and apertures 96 formed in the bunk adjacent opposite ends thereof. The brackets and bolts thus form a quickly releasable coupling between the container and the bunk effective securely to lock the former to the latter. The container is supported adjacent its rear end by the roller 44 which forms a bearing therefor.

The vehicle according to this invention enables any load which is blocked off the ground or, for example, the top of the railroad freight car or the like to a height sufficient to permit the rear end of the trailer frame to pass thereunder to be moved on or off the trailer. In the drawings, FIGURES 5 to 8 show by way of example different stages in the movement of the freight container 16 from the vehicle onto a railroad freight car indicated generally at 100. The vehicle is initially backed up into end to end relationship with the flat car 100. The locking means for rear wheel assembly 14, i.e. bolts 66 and 67 are then released and either chocks are placed under the rear wheels or alternatively the trailer brakes are applied to restrain the wheel assembly 14 from movement. The tractor is then backed towards the flat car 100, the roller 46 engaging and rolling over the top surface of the flat car. The tractor 10 is backed to a position whereat the container 16 is correctly positioned over the rail car whereupon an appropriate amount of blocking is placed on the rail car beneath the rear end of the container 16. The bunk locking means, i.e. pin 88 is then released and the tractor 10 is driven forward, the container 16 remaining in position over the flat car at this time due to the relative movement between the bunk 80 and the trailer. When the tractor has been moved forward through a distance sufficient to bring the rear end of the trailer 12 over the wheel assembly 14, the latter is locked to the former, appropriate blocking is placed under the forward end of the container and the means locking the latter to the bunk is released. The trailer wheel brakes are then released and the vehicle is driven forwardly and away from the flat car 100, leaving the container correctly positioned on the flat car 100 ready for transportation by rail. The container 16 may be transferred from the flat car 100 onto the trailer 12 by reversing the above procedure.

In some applications, the tractor 10 may have insufficient power or the loads to be handled may be too heavy to be transferred in the manner outlined above. To allow for this possibility a suitable winch 102 may be mounted on the tractor 10 behind the cab thereof, the winch 102 being driven from the tractor power unit in any suitable and well-known manner. With this arrangement, a load may be hauled onto the trailer 12 by connecting the cable 104 to the front end thereof and energizing the winch 102. In an alternative arrangement, the bunk 80 may be directly driven by means of a suitable power coupling from the power unit of the tractor. To provide further assistance in moving a load onto and off the trailer, the rollers 44 and 46 may, if desired, be powered by connection to a suitable power-take-off on the tractor 10.

Where the freight container consists of a hollow box, tank or the like, permanent blocking can be built on the bottom of the container adjacent each corner thereof, thereby eliminating the handling of blocking when placing the container on the ground or on a flat car or the like. In applications where the load consists of poles, lumber or the like, the load is preferably blocked on false bunks which are placed beneath the load to facilitate its transfer to the trailer.

What I claim as my invention is:

1. Freight handling apparatus comprising in combination a vehicle having a prime mover, a trailer connected to said prime mover, a wheel assembly positioned beneath and coupled to said trailer, said wheel assembly movable longitudinally of said trailer, a bunk mounted on the trailer for movement longitudinally thereof, means on the bunk for gripping one end of a load resting on said bunk, the opposite end of said load when the bunk is at the end of the trailer near said prime mover resting on the trailer, and means releasably locking said wheel assembly and said bunk at selected positions along said trailer.

2. In an apparatus for handling freight the combination of a vehicle having a prime mover; a trailer connected at one end to said prime mover, said trailer comprising an elongated framework; a wheel assembly mounted on a carriage, said carriage movable longitudinally of said framework; a bunk mounted on the trailer for movement longitudinally thereof, means on the bunk for gripping one end of a load resting on said bunk, the opposite end of said load when the bunk is at the end of the trailer near said prime mover resting on the trailer; and means for locking said carriage and said bunk at selected positions along said trailer.

3. In an apparatus for handling freight the combination of a vehicle having a prime mover; a trailer connected at one end to said prime mover, said trailer comprising a framework provided with two pairs of spaced apart tracks extending longitudinally thereof; a rear wheel assembly mounted on a carriage, said carriage provided with wheels adapted to engage one of said pairs of tracks for movement longitudinally of said trailer; a carrier mounted on said trailer and movable longitudinally thereof along the other of said pairs of tracks; and means for locking said carriage and said bunk at selected positions along said trailer.

4. In an apparatus for handling freight the combination of a vehicle having a prime mover; a trailer connected at one end to said vehicle, said trailer comprising an elongated framework provided with two sets of tracks extending longitudinally thereof; a rear wheel assembly mounted on a carriage adapted to engage one of said sets of tracks for movement longitudinally of said trailer; a roller-borne carrier mounted on said trailer and movable longitudinally thereof along the other set of said tracks; and means for locking said rear wheel assembly and said carrier at selected positions along said framework.

5. Freight handling apparatus comprising in combination a vehicle having a prime mover; a trailer connected to said prime mover, said trailer comprising an elongated platform having a pair of parallel tracks extending longitudinally thereof; a rear wheel assembly positioned beneath said platform and provided with rollers upstanding therefrom, said rollers adapted to engage one of said pairs of tracks whereby said rear wheel assembly may be moved longitudinally relative to said platform, and a carrier provided with rollers depending therefrom, said carrier rollers adapted to engage the other one of said pairs of tracks whereby said carrier may be moved longitudinally of said trailer.

6. Freight handling apparatus comprising in combination a vehicle having a prime mover; a trailer connected to said prime mover, said trailer comprising an elongated platform having pairs of parallel tracks extending longitudinally thereof; a rear wheel assembly positioned beneath said platform and provided with rollers adapted to engage one of said pairs of tracks whereby said rear wheel assembly may be moved longitudinally relative to said platform; a carrier provided with rollers adapted to engage the other one of said pairs of tracks whereby said carrier may be moved longitudinally of said trailer; and means for locking said rear wheel assembly at selected positions along said platform.

7. Freight handling apparatus comprising a combination a vehicle having a prime mover; a trailer connected to said prime mover, said trailer comprising an elongated platform having a pair of parallel tracks extending longitudinally thereof; a rear wheel assembly positioned beneath said platform and provided with rollers upstanding therefrom, said rollers adapted to engage said tracks whereby said rear wheel assembly may be moved longitudinally relative to said platform; means for locking said rear wheel assembly at selected positions along said platform, a bunk mounted on said platform and extending transversely thereof, said bunk movable longitudinally of said platform; and means for locking said bunk at selected positions along said platform.

8. Freight handling apparatus comprising in combination a vehicle having a prime mover; a trailer connected to said prime mover, said trailer comprising an elongated framework coupled at one end to said prime mover and provided adjacent its other end with a pair of rollers extending transversely of said framework, said rollers rotatably mounted on said framework, one of said rollers projecting below the lower surface beyond said other end of the framework and the other of said rollers projecting above the upper surface of said framework inwardly of said other end; a rear wheel assembly coupled to said trailer and movable longitudinally thereof; means for locking said rear wheel assembly at selected positions along said trailer; and a freight container removably mounted on said trailer.

9. Freight handling apparatus comprising in combination a vehicle having a prime mover; a trailer connected to said prime mover, said trailer comprising an elongated platform having a pair of parallel tracks extending longitudinally thereof; a rear wheel assembly positioned beneath said platform and provided with rollers upstanding therefrom, said rollers adapted to engage said tracks whereby said rear wheel assembly may be moved longitudinally relative to said platform; means for locking said rear wheel assembly at selected positions along said platform; a bunk mounted on said platform and extending transversely thereof, said bunk movable longitudinally of said platform; means for locking said bunk at selected positions along said platform; and a pair of rollers rotatably mounted on said platform adjacent the end thereof remote from said prime mover and extending transversely thereof, one of said rollers projecting below the lower surface of said platform and the other of said rollers projecting above the upper surface of said platform.

10. Freight handling apparatus comprising in combination a vehicle having a prime mover; a trailer connected to said prime mover, said trailer comprising an elongated platform having a pair of parallel tracks extending longitudinally thereof; a rear wheel assembly positioned beneath said platform and provided with rollers upstanding therefrom, said rollers adapted to engage said tracks whereby said rear wheel assembly may be moved longitudinally relative to said platform; means for locking said rear wheel assembly at selected positions along said platform; a bunk mounted on said platform and extending transversely thereof, said bunk movable longitudinally of said platform; means for locking said bunk at selected positions along said platform; a pair of rollers rotatably mounted on said platform adjacent the end thereof remote from said prime mover and extending transversely thereof, one of said rollers projecting below the lower surface of said platform and the other of said rollers projecting above the upper surface of said platform; and a freight container removably mounted on said trailer, said freight container having one end positioned on and releasably secured to said bunk and the opposite end thereof bearing on and supported by said upwardly projecting transverse rollers.

11. Freight handling apparatus comprising in combination a vehicle having a prime mover; a trailer connected to said prime mover, said trailer comprising an elongated platform provided with two sets of parallel tracks extending longitudinally thereof, a rear wheel assembly positioned beneath said platform and provided with rollers upstanding therefrom, said rollers adapted to engage one of said sets of tracks whereby said rear wheel assembly may be moved longitudinally of said platform; and a bunk mounted above said platform and extending transversely thereof, said bunk provided with wheels adapted to engage the other set of tracks whereby said bunk may be moved longitudinally of said platform.

12. Freight handling apparatus comprising in combination a vehicle having a prime mover; a trailer connected to said prime mover, said trailer comprising an elongated platform provided with two sets of parallel tracks extending longitudinally thereof and provided adjacent the end thereof remote from said prime mover with a pair of rollers extending transversely of said platform, said rollers rotatably mounted on said platform, one of said rollers projecting below the lower surface of said platform and the other of said rollers projecting above the upper surface of said platform; a rear wheel assembly positioned beneath said platform and provided with rollers upstanding therefrom, said rollers adapted to engage one of said sets of tracks whereby said rear wheel assembly may be moved longitudinally of said platform; and a bunk mounted above said platform and extending transversely thereof, said bunk provided with wheels adapted to engage the other set of tracks whereby said bunk may be moved longitudinally of said platform.

13. Freight handling apparatus as claimed in claim 11 including means for locking said rear wheel assembly to said trailer at selected positions along said platform.

14. Freight handling apparatus as claimed in claim 11 including means for locking said bunk to said trailer at selected positions along said platform.

15. Freight handling apparatus as claimed in claim 14 including a freight container adapted to be removably mounted on said trailer and means on said bunk for releasably securing said container thereto.

16. Freight handling apparatus comprising in combination a vehicle having a prime mover; a trailer connected to said prime mover, said trailer comprising an elongated platform having a pair of parallel tracks extending longitudinally thereof; a rear wheel assembly positioned beneath said platform and provided with rollers upstanding therefrom, said rollers adapted to engage said tracks whereby said rear wheel assembly may be moved longitudinally relative to said platform; means for locking said rear wheel assembly at selected positions along said platform, a bunk mounted on said platform and extending transversely thereof, said bunk movable longitudinally of said platform, means for locking said bunk at selected positions along said platform; and bearing means rotatably mounted on said platform adjacent the end thereof remote from said prime mover and extending transversely thereof, one of said bearing means projecting below the lower surface of said platform and the other of said rollers projecting above the upper surface of said platform.

17. Freight handling apparatus comprising in combination a vehicle having a prime mover; a trailer connected to said prime mover, said trailer comprising an elongated platform having a pair of parallel tracks extending longitudinally thereof, a rear wheel assembly positioned beneath said platform and provided with rollers upstanding therefrom, said rollers adapted to engage said tracks whereby said rear wheel assembly may be moved longitudinally relative to said platform; means for locking said rear wheel assembly at selected positions along said platform, a bunk mounted on said platform and extending transversely thereof, said bunk movable longitudinally of said platform, means for locking said bunk at selected positions along said platform; bearing means rotatably mounted on said platform adjacent the end thereof remote from said prime mover and extending transversely thereof, one of said bearing means projecting below the lower surface of said platform and the other of said rollers projecting above the upper surface of said bearing means; and a freight container removably mounted on said trailer, said freight container having one end positioned on and releasably secured to said bunk and the opposite end thereof bearing on and supported by said upwardly projecting bearing member.

18. A semi-trailer assembly comprising a framework provided with two pairs of spaced apart tracks extending longitudinally thereof; a rear wheel assembly mounted on a carriage, said carriage provided with wheels adapted to engage one of said pairs of tracks for movement longitudinally of said trailer; a carrier mounted on said trailer and movable longitudinally thereof along the other of said pairs of tracks; and means for locking said carriage and said carrier at selected positions along said trailer.

19. A semi-trailer assembly comprising an elongated platform having a pair of parallel tracks extending longitudinally thereof; a rear wheel assembly positioned beneath said platform and provided with rollers upstanding therefrom, said rollers adapted to engage said tracks whereby said rear wheel assembly may be moved longitudinally relative to said platform; means for locking said rear wheel assembly at selected positions along said platform; a bunk mounted on said platform and extending transversely thereof, said bunk movable longitudinally of said platform; means for locking said bunk at selected positions along said platform and a pair of rollers rotatably mounted on said platform adjacent the end thereof remote from said prime mover and extending transversely thereof, one of said rollers projecting below the lower surface of said platform and the other of said rollers projecting above the upper surface of said platform.

References Cited in the file of this patent
UNITED STATES PATENTS

| | | |
|---|---|---|
| 2,010,969 | Soulis | Aug. 13, 1935 |
| 2,630,329 | Ryan | Mar. 3, 1953 |
| 2,818,272 | De Lay | Dec. 31, 1957 |
| 2,859,889 | Love | Nov. 11, 1958 |